United States Patent [19]

Sugiyama

[11] Patent Number: 5,143,317

[45] Date of Patent: Sep. 1, 1992

[54] TAPE CASSETTE WITH DUAL HUB LOCK TORSION SPRINGS

[75] Inventor: Masanobu Sugiyama, Miyagi, Japan

[73] Assignee: Sony Corporation, Shinagawa, Japan

[21] Appl. No.: 625,885

[22] Filed: Dec. 11, 1990

[30] Foreign Application Priority Data

Dec. 20, 1989 [JP] Japan .................................. 1-330839

[51] Int. Cl.[5] ........................ G11B 15/18; G11B 15/22
[52] U.S. Cl. .................................... 242/199; 242/198; 360/132
[58] Field of Search ................ 242/198, 199, 200, 197; 360/132

[56] References Cited

U.S. PATENT DOCUMENTS

| | | | |
|---|---|---|---|
| 3,801,042 | 4/1974 | Dobson | 242/199 |
| 4,660,784 | 4/1987 | Sumida et al. | 360/132 |
| 4,671,469 | 6/1987 | Ikebe et al. | 242/198 |
| 4,676,453 | 6/1987 | Komiyama et al. | 242/199 |

FOREIGN PATENT DOCUMENTS

| | | |
|---|---|---|
| 163293 | 12/1985 | European Pat. Off. ............. 360/132 |
| 2173170 | 10/1986 | European Pat. Off. . |
| 210854 | 2/1987 | European Pat. Off. . |
| 255775 | 2/1988 | European Pat. Off. . |
| 323199 | 7/1989 | European Pat. Off. . |
| 62-279573 | 12/1987 | Japan .................................. 360/132 |

Primary Examiner—Daniel P. Stodola
Assistant Examiner—John Q. Nguyen
Attorney, Agent, or Firm—Lewis H. Eslinger; Jay H. Maioli

[57] ABSTRACT

A magnetic tape cassette having a cassette casing formed of upper and lower parts, reel hubs accommodated within the cassette casing and around which a magnetic tape is wound, a locking member for locking rotation of the reel hubs, a tape loading pocket portion formed on any one of the upper and lower parts, a slider for opening and closing reel shaft insertion apertures, a slider lock member provided on the part through the reel shaft insertion apertures are formed and for locking the slider at an opening position and at a closing position and limiter pins for preventing the slider lock member from being deformed more than is necesssary. This magnetic tape cassette is comprised of a pair of left and right hub lock springs for spring-biasing the hub lock member in the direction in which the reel hubs are locked, wherein one end portions of the two hub lock springs are slidably engaged with the hub lock member, coil spring portions are formed on the other end portion of the hub lock springs, the coil spring portions are inserted into the limiter pins, the hub lock springs are engaged with and secured to at their intermediate portions one of the upper and lower parts while being deformed with resiliency, and the coil spring portions are opposed to the slider lock member.

3 Claims, 6 Drawing Sheets

TAPE CASSETTE WITH DUAL HUB LOCK TORSION SPRINGS

BACKGROUND OF THE INVENTION

1. Field of the Invention

The present invention generally relates to magnetic tape cassettes and, more particularly, is directed to a magnetic tape cassette which can be applied to a digital audio tape recorder using a rotary head (i.e. R-DAT).

2. Description of the Prior Art

A digital audio tape recorder has been proposed so far, in which an analog signal such as an audio signal or the like is converted to a digital signal and this digital signal is recorded on and/or reproduced from a magnetic tape. As such digital audio tape recorder, the R-DAT is proposed, which utilizes a rotary head to provide a high recording density.

In the magnetic tape cassette used in the high density recording, if a magnetic tape is smudged by oily components such as fingerprints and dusts or the like, a drop-out occurs in a reproduced signal. Therefore, in order to avoid the occurrence of such drop-out, the magnetic tape must be shielded within the magnetic tape cassette.

An arrangement of a magnetic tape cassette of a shield type for the DAT will be explained with reference to FIGS. 1 to 4.

As illustrated, a magnetic tape cassette represented by reference numeral 1 includes a cassette casing 2, and the cassette casing 2 is formed by fastening an upper half or upper part 3 and a lower half or lower part 4 by some suitable means such as screws or the like. A pair of reel shaft insertion apertures 5 are bored through the lower part 4, and a pair of reel hubs 7 around which a magnetic tape 6 is wound are rotatably supported in the pair of reel shaft insertion apertures 5. The magnetic tape 6 wound around the reel hubs 7 is extended between left and right tape guides 8 provided at the lower half 4 and is exposed to a front. surface opening portion 9 of the cassette casing 2.

At the front portion of the lower part 4, a loading pocket portion 10 is formed, and this pocket portion 10 has a recess portion of U-letter configuration formed at its portion corresponding to the rear side of the magnetic tape 6 exposed to the front opening portion 9. When this magnetic tape cassette is loaded onto a magnetic recording and reproducing apparatus (not shown), a tape loading guide member on the apparatus side enters this pocket portion 10 and withdraws the magnetic tape 6 to the front of the cassette casing 2 (so-called tape loading is performed).

A transparent window portion 11 is formed on the upper part 3, and the user can visually confirm the tape volume of this magnetic tape 6 wound around the reel hubs 7 via this transparent window portion 11. A front lid 12 which opens and closes the front surface opening portion 9 of the cassette casing 2 is attached to the front end portion of the upper half 3 so that it can be pivoted in the vertical direction. When the magnetic tape cassette 1 is not in use, the front surface opening portion 9, i.e. the magnetic tape exposed portion is covered by the front lid 12. When this magnetic tape cassette is loaded onto the magnetic recording and reproducing apparatus, the front lid 12 is pivoted upwards in the vertical direction by a mechanism on the apparatus side, thereby the magnetic tape 6 being uncovered and exposed to the outside.

Further, as shown in FIG. 3, a hub lock member 13 is assembled within the cassette casing 2 so as to inhibit the left and right reel hubs 7 from being rotated uselessly when the magnetic tape cassette is not in use.

The hub lock member 13 is provided with engaging protrusions 13a which correspond with engaging slits 7a formed around the outer peripheral portions of the reel hubs 7. The hub lock member 13 is always spring-biased in the locking direction by a hub lock spring 14 secured to a spring securing portion 13b provided at the central portion of hub lock member 13. The hub lock spring 14 might be formed of a torsion spring. More specifically, the hub lock spring 14 extends its two ends in a substantially inverted V-letter configuration and two ends 14a of the hub lock spring 14 are brought in contact with a front wall 3a of the upper part 3, whereby the hub lock member 13 is always spring-biased in the rear direction, i.e. in the direction in which the engaging protrusions 13a are engaged with the engaging slits 7a of the reel hubs 7. Thus, the reel hubs 7 are locked so as not to rotate when the magnetic tape cassette 1 is not in use.

When the magnetic tape cassette 1 is loaded onto the magnetic recording and reproducing apparatus and the front lid 12 is opened upwardly and rotated as described above, rear end portions 12a of two side surfaces of the front lid 12 are brought in contact with and in engagement with engaging portions 13c elongated to the front portions of the two end portions of the hub lock member 13 to thereby withdraw the engaging portions 13c. Therefore, the hub lock member 13 is moved in the frontward direction, i.e. in the direction in which the engaging protrusions 13a are disengaged from the engaging slits 7a of the reel hubs 7 while spring-biasing the torsion spring 14 in its opening direction, thus releasing the reel hubs 7 from their locked conditions.

The hub lock member 13 is assembled within the cassette casing 2 at the same time when the upper and lower parts 3 and 4 are fastened together under the condition such that the hub lock member 13 is slidably engaged on the upper part 3 in the front to back direction beforehand in the assembly process of the magnetic tape cassette. An engaging structure in which the hub lock member 13 is engaged with the upper part 3 will be explained hereinafter. Rectangular openings 15 long in the front to back direction are bored through the left and right portions of the hub lock member 13 and the hub lock member 13 attached to the upper part 3 by caulking pins 16 formed on the inner surface side of the upper part 3 within the rectangular openings 15. Therefore, the hub lock member 13 is slidably moved along the inner surface of the upper part 3 in the front to back direction.

A sliding member or slider 17 is attached to the bottom surface of the lower part 4 of the cassette casing 2 so as to become slidable in the front to back direction. When the magnetic tape cassette is not in use, the slider 17 is located at the front closing position and covers the pocket portion 10 and the reel shaft insertion apertures 5 of the lower part 4. Further, when the magnetic tape cassette is loaded onto the magnetic recording and reproducing apparatus, the slider 17 is slidably moved to the rear opening position by a mechanism of the magnetic recording and reproducing apparatus side, whereby the pocket portion 10 and the reel shaft insertion apertures 5 of the lower part 4 are uncovered.

A slider locking mechanism is provided between the slider 17 and the lower half 4 to hold the slider 17 in the locked condition at the front closing position and at the rear opening position. More specifically, as shown in FIG. 2, this slider locking mechanism is comprised of left and right slider lock members 18 which are formed on one portion of the lower part 4 so as to be vibratory in the vertical to lower direction and front and back engaging apertures 19a and 19b bored through the slider 17 in correspondence with the slider lock members 18. Under the condition that engaging convex portions 18a formed on the tops of the slider lock members 18 are engaged with the rear engaging apertures 19b, the slider 17 is locked at the front closing position, while under the condition that the engaging convex portions 18a of the slider lock members 18 are engaged with the front engaging apertures 19a, the slider 17 is locked at the rear opening position. The slider 17 locked by the slider locking members 18 is released from its locked condition by a releasing member (not shown) provided at the magnetic recording and reproducing apparatus side.

Limiter pins 20 are protruded on the inner side surface of the upper part 3 in correspondence with the slider lock members 18, and the top surfaces of the limiter pins 20 are opposed to the inner surface sides of the top portions of the slider locking members 18 with a predetermined spacing. The limiter pins 20 restrict the amount in which the slider lock members 18 are vibrated with resiliency, or the limiter pins 20 can prevent the slider lock members 18 from being vibrated and deformed more than is necessary, thereby being prevented from being damaged.

In the conventional DAT tape cassette thus constructed, the slider 17 is locked only by the resiliency of the slider lock member 18 so that, because the slider 17 is opened and/or closed repeatedly or due to aging change, the engaging force of the slider lock member 18 is weakened, resulting in the locked condition of the slider 17 being loosened.

To remove this disadvantage, a magnetic tape cassette is proposed, in which a coil spring is additionally interposed between the upper part 3 and the top portion of the slider lock member 18 and a lock holding force applied to the slider 17 by the slider lock member 18 is reinforced by the resilient force of this coil spring (see Japanese Patent Laid-Open Gazette No. 62-79573).

However, in the case of this conventional magnetic tape cassette, the slider locking coil spring is additionally incorporated in addition to the ordinary arrangement, which increases the number of assembly parts. In addition, the assembly work for assembling the very small coil spring is very complicated, which provides a complicated assembly process of a magnetic tape cassette and an expensive magnetic tape cassette.

OBJECTS AND SUMMARY OF THE INVENTION

Accordingly, it is an object of the present invention to provide an improved magnetic tape cassette which can eliminate the aforenoted shortcomings and disadvantages encountered with the prior art.

More specifically, it is an object of the present invention to provide a magnetic tape cassette in which a slider can be positively locked at its closed position or at its opened position.

It is another object of the present invention to provide a magnetic tape cassette in which the increase of assembly parts can be minimized.

It is a further object of the present invention to provide a magnetic tape cassette which can be made inexpensively.

As an aspect of the present invention, a magnetic tape cassette includes a cassette casing formed of upper and lower parts, reel hubs accommodated within the cassette casing and around which a magnetic tape is wound, a locking member for locking rotation of the reel hubs, a tape loading pocket portion formed on any one of the upper and lower parts, a slider for opening and closing reel shaft insertion apertures, a slider lock member for locking the slider at an opening position and at a closing position and limiter pins for preventing the slider lock member from being deformed more than is necessary. This magnetic tape cassette is comprised of a pair of left and right hub lock springs for spring-biasing the hub lock member in the direction in which the reel hubs are locked.

The above, and other objects, features and advantages of the present invention will be apparent in the following detailed description of an illustrative embodiment when read in conjunction with the accompanying drawings, in which like reference numerals are used to identify the same or similar parts in the several views.

DETAILED DESCRIPTION OF THE PREFERRED EMBODIMENT

Figure 1:
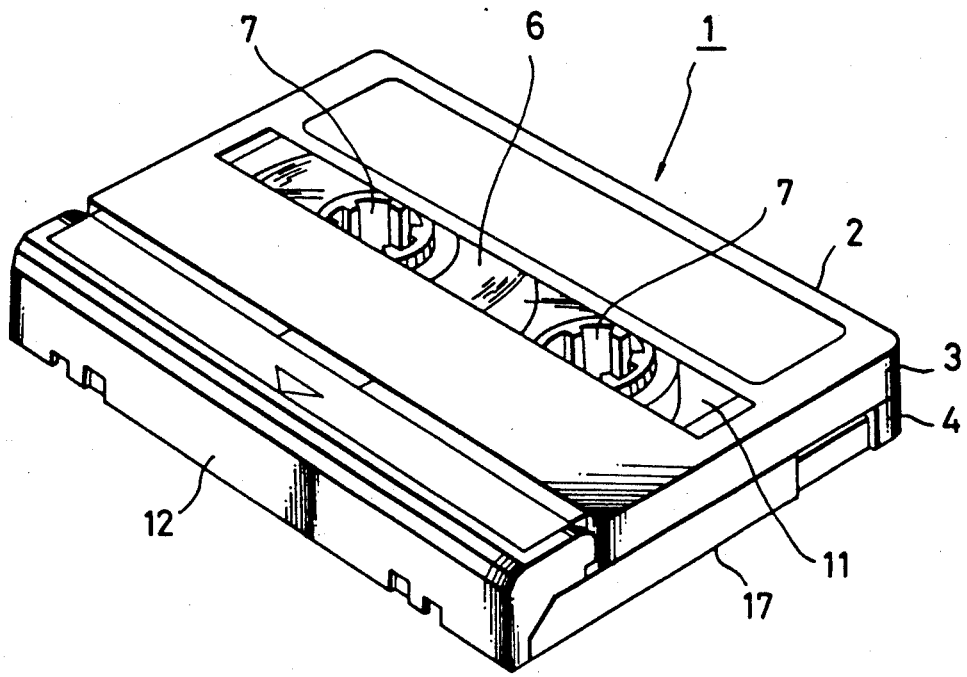
FIG. 1 is a perspective view illustrating an example of a conventional magnetic tape cassette.
Figure 2:
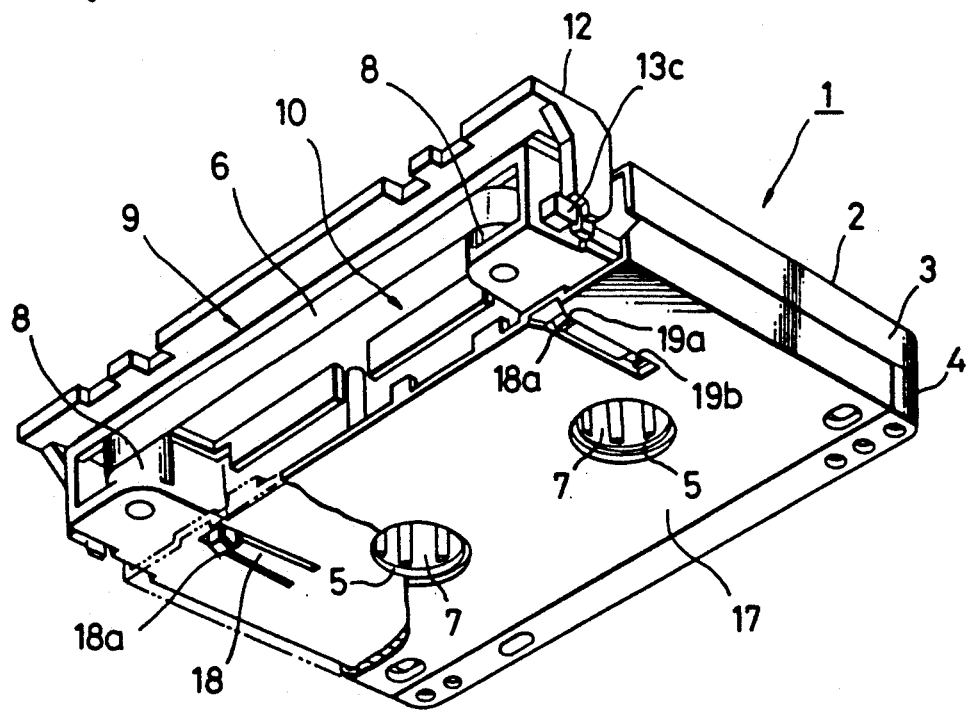
FIG. 2 is a perspective view of the conventional magnetic tape cassette of FIG. 1 and illustrating the condition that a front lid and a slider of the conventional magnetic tape cassette are opened.
Figure 3:
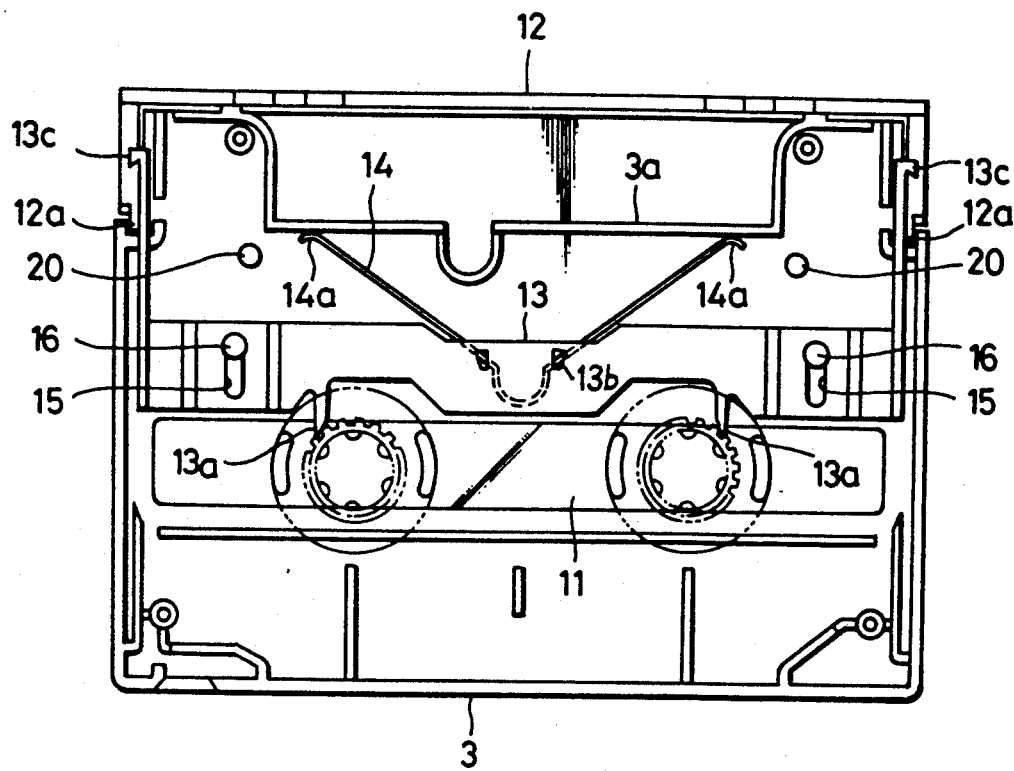
FIG. 3 is a plan view of the conventional magnetic tape cassette of FIG. 1 and illustrating the inside portion of an upper part thereof.
Figure 4:
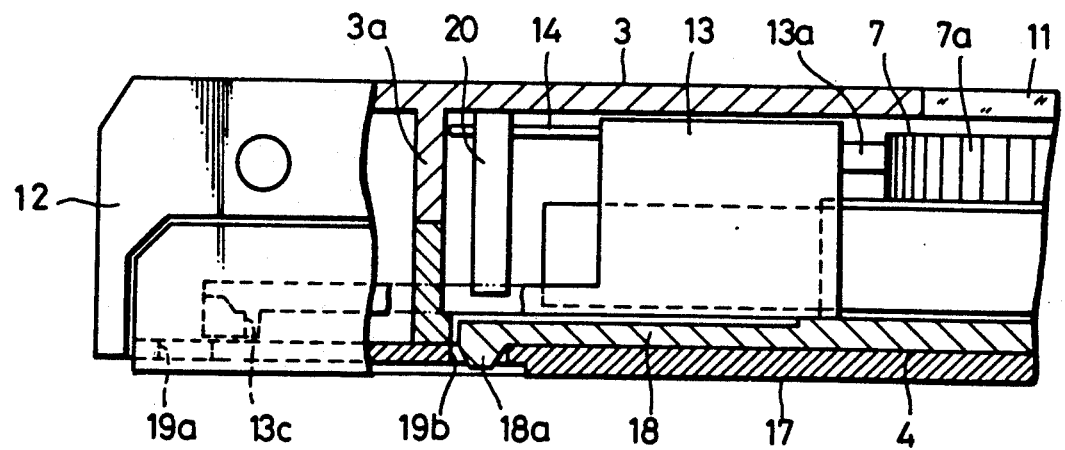
FIG. 4 is a view of the conventional magnetic tape cassette of FIG. 1 and illustrating one portion thereof in a cross-sectional fashion.
Figure 5:
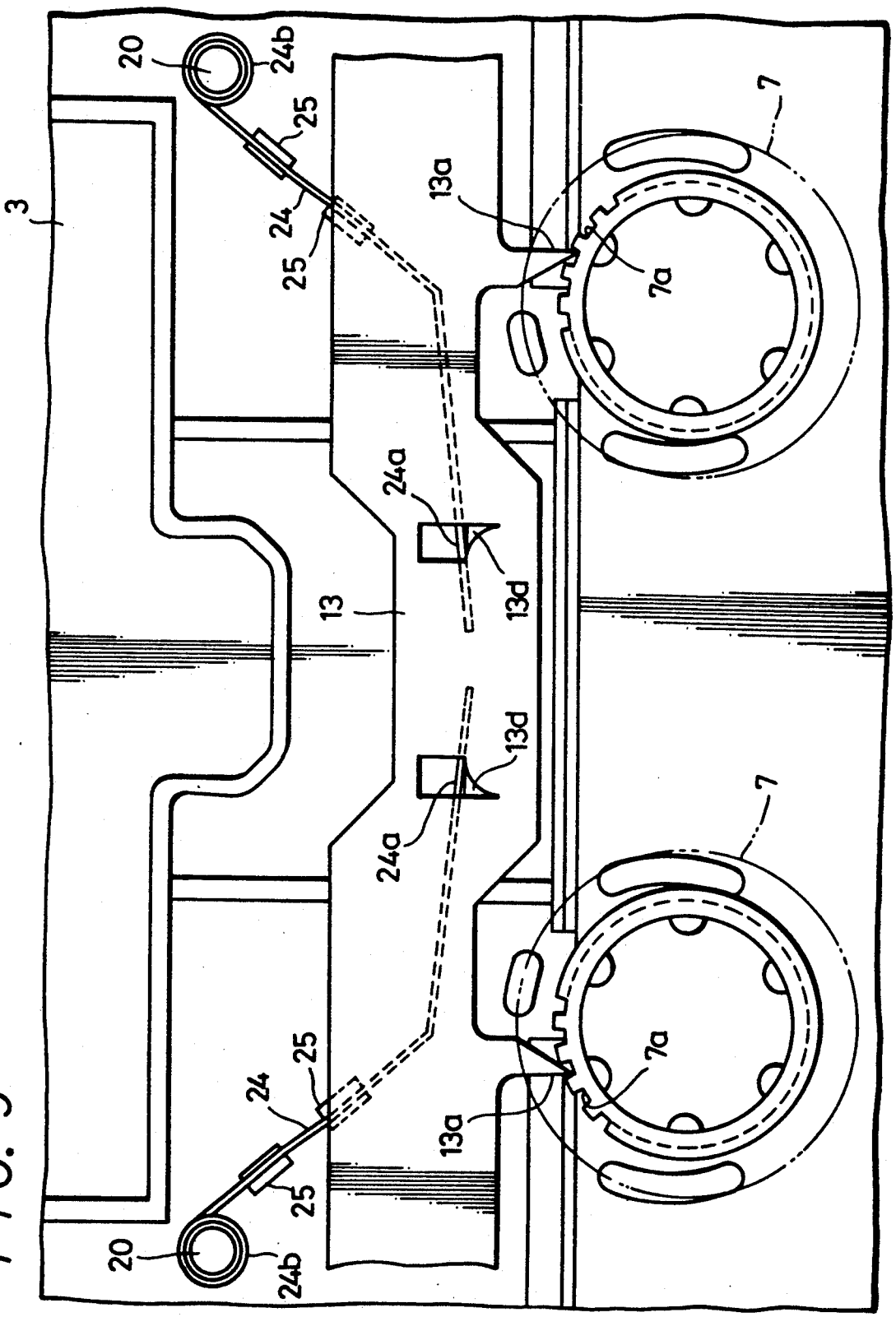
FIG. 5 is a plan view of an embodiment of a magnetic tape cassette according to the present invention and illustrating the inside portion of a main portion of an upper part thereof.
Figure 6:
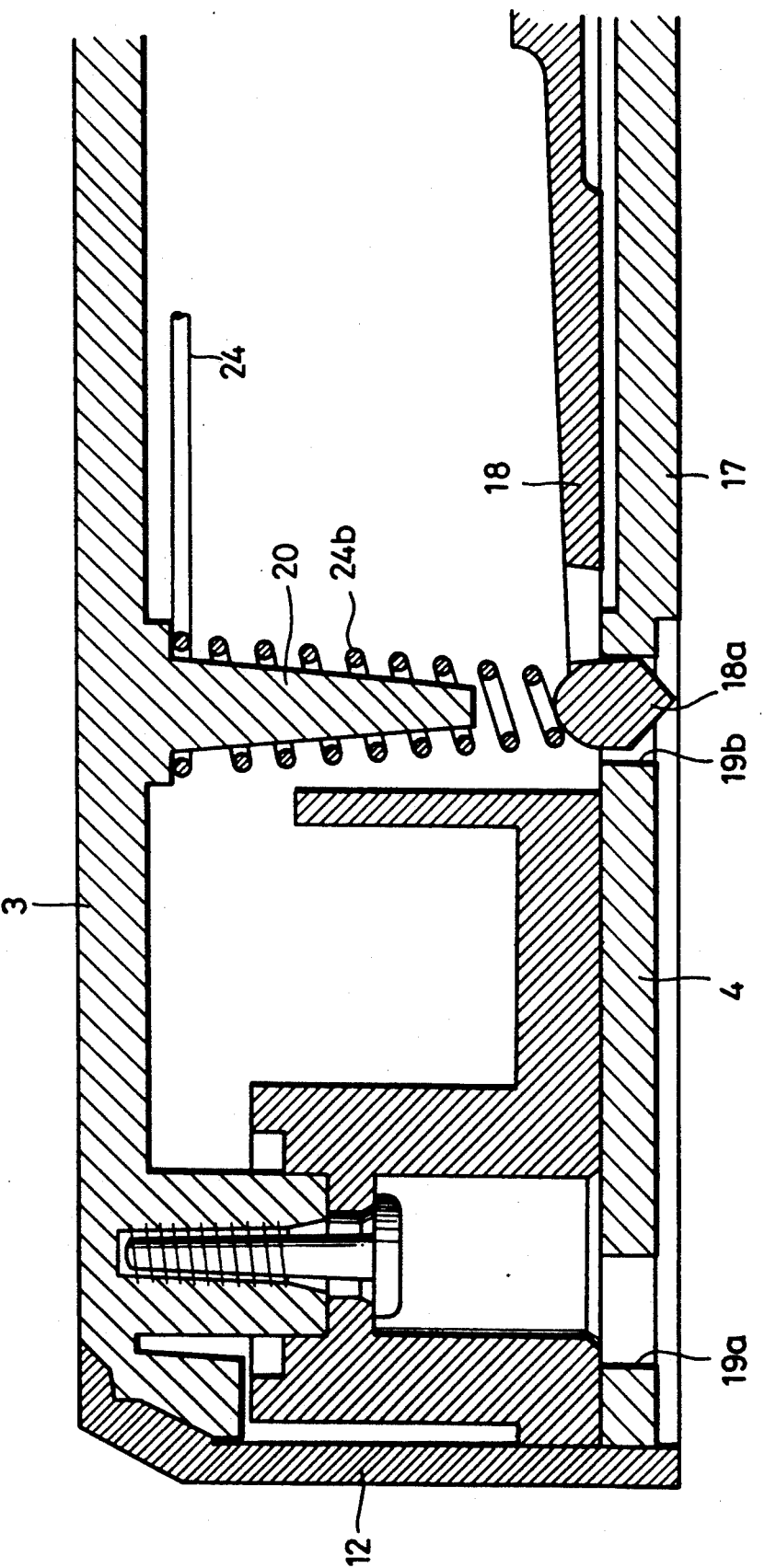
FIG. 6 is a cross-sectional side view of a main portion of the magnetic tape cassette of FIG. 5.
Figure 7:
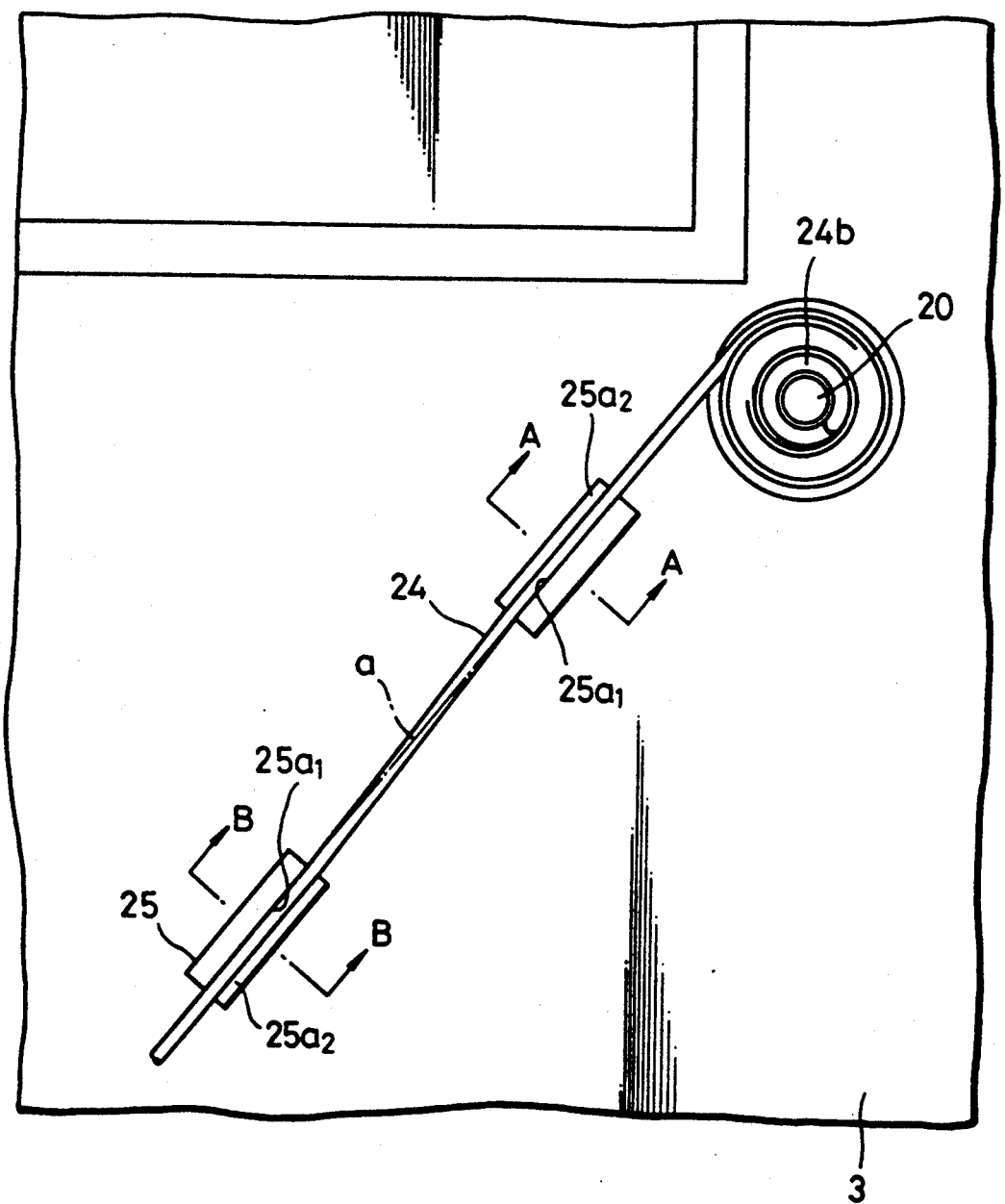
FIG. 7 is a fragmentary plan view of a main portion of the present invention and illustrating the condition that a hub lock spring is mounted.
Figure 8A:
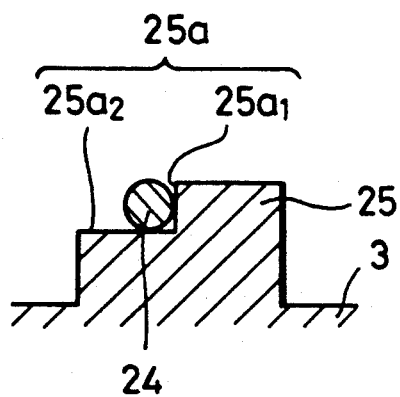
FIG. 8A is a cross-sectional view taken through the line A—A in FIG. 7.
Figure 8B:
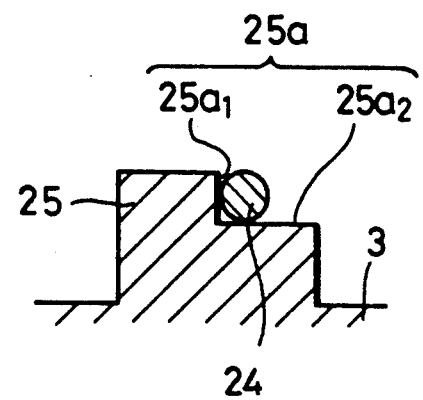
FIG. 8B is a cross-sectional view taken through the line B—B in FIG. 7.
Figure 9A:
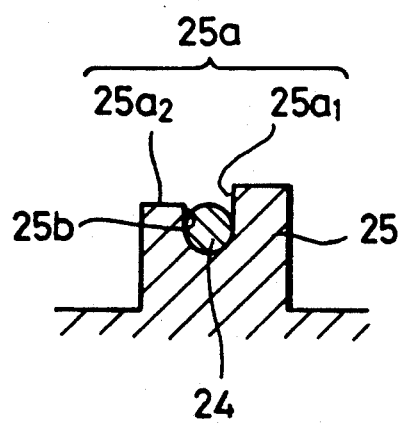
FIGS. 9A and 9B are cross-sectional views corresponding to FIGS. 8A and 8B, respectively.
Figure 9B:
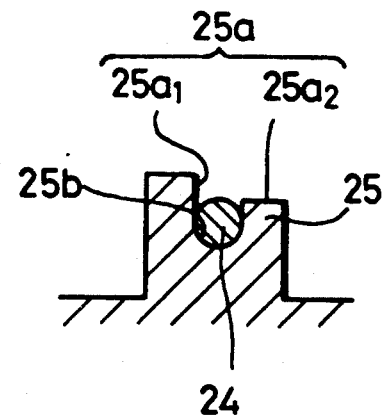

An embodiment of the magnetic tape cassette according to the present invention will hereinafter be described with reference to FIG. 5 to FIGS. 9A and 9B, wherein like parts corresponding to those of the example of the conventional magnetic tape cassette shown in FIGS. 1 to 4 are marked with the same references and therefore need not be described in detail. In this embodiment, only a main portion will be described, and the most specific feature of the present invention lies in that a hub lock spring for spring-biasing a hub lock member in the locking direction is served also as an auxiliary spring for a slider lock member.

More specifically, in this embodiment, the hub lock spring is formed of a pair of left and right hub lock springs 24. In the two hub lock springs 24, one end portion sides 24a thereof are formed as hub lock member spring-biasing portions which are slidably engaged with the hub lock member 13 to push the hub lock member 13. Thus, the hub lock springs 24 are constructed substantially as torsion springs. On the other end portions of the hub lock springs 24, there are provided coil spring portions 24b in the direction perpendicular to the axial direction and, the two hub lock springs 24 are shaped symmetrically with respect to the vertical direction.

When the hub lock member 13 is assembled to the upper part 3, the two hub lock springs 24 are assembled to the magnetic tape cassette as follows. The coil spring portions 24b are engaged with the limiter pins 20 planted on the inner surface of the upper part 3 and the intermediate portions of the hub lock springs 24 are engaged with engagement supporting portions 25 protruded on the inner surface of the upper part 3, whereby the two hub lock springs 24 are provided symmetrically with respect to the center of the hub lock member 13 on the inner surface of the upper part 3. Then, one end portions 24a of the springs 24 are brought in contact with and engaged with contact engaging portions 13d of the hub lock member 13 on its side portion, thus the two hub lock springs 24 being assembled to the upper part 3.

In this arrangement, the limiter pins 20 and the coil spring portions 24b of the two hub lock springs 24 are each shaped as frusta and, a plurality of, for example, two engagement supporting portions 25 for engagingly supporting the two hub lock springs 24 are each protruded on the inner surface of the upper part 3 at a predetermined spacing. In this embodiment, engaging surfaces 25a of the two engagement supporting portions 25 are formed to have configurations of L letter cross section in their opposing directions and vertical engagement surface portions 25a1 of the engaging surfaces 25a are coincident with a straight line a shown by a one-dot chain line in FIG. 7. Accordingly, when the hub lock spring 24 is engaged with the engagement supporting portions 25, the hub lock spring 24 is deformed by an amount of its diameter between the engaging surfaces 25a so that the hub lock spring 24 is urged against the vertical engagement surface portions 25a1 and secured thereto by a force of restitution to become straight under the condition that it is in contact with horizontal engagement surface portions 25a2.

Under the finished state of the assembly-process in which the upper part 3 and the lower part 4 are fastened together, the top of the coil spring portion 24b of the hub lock spring 24 is brought in contact with the inner surface of the top portion of the slider lock member 18. In that case, the coil spring portion 24b of the hub lock spring 24 is opposed at its tapered portion to the lower part 4 side and therefore comes in contact with the slider lock member 18 at its predetermined position positively. Thus, the resilient force of the hub lock spring 24 can reinforce the engaging force of the slider lock member 18 relative to the slider 17.

Under this condition, the hub lock spring 24 is secured at its intermediate portion to the upper part 3 by the engagement supporting portion 25 so that, even when the one end portion 24 of the hub lock spring 24 is deformed with resiliency by the lock releasing operation of the hub lock member 13, the coil spring portion 24b can be prevented from being affected at all. Accordingly, the coil spring portion 24b can be prevented from being displaced from the predetermined portion of the slider lock member 18 and the spring force of the coil spring portion can be prevented from being changed. Further, the one end portion 24a of the hub lock spring 24 can positively spring-bias the hub lock member 13 regardless of the contraction and expansion of the coil spring portion 24b, i.e. the pushing operation against the slider lock member 18.

Further, since the hub lock springs 24 are separately provided with respect to the slider lock member 18, the spring-biasing force is applied to the slider lock member 18 in a well-balanced condition, thus the two reel hubs 5 being locked or being released from their locked states smoothly and positively.

As described above, according to this embodiment, since the symmetrical hub lock springs 24 for spring-biasing the hub lock member 13 in the locking direction are provided with the coil spring portions 24b which reinforce the lock holding force of the slider lock member 18, the increase of the assembly parts can be suppressed and the assembly process can be simplified as compared with the conventional tape cassette in which the slider lock reinforcing spring is independently assembled.

Further, since the hub lock spring 24 is not affected by its one end portion 24b and acts as the spring-biasing means independently of its one end portion 24a which spring-biases the hub lock member 13, the coil spring portion 24b can positively reinforce the lock holding force of the slider lock member 18. Accordingly, even when the slider lock member 18 itself is lowered in resiliency by repeatedly opening and closing the slider 17 or due to aging change or even when the slider lock member 18 is deformed by heat while being kept in a high temperature under the condition that the slider 17 is opened or that the slider 17 is not closed fully, the slider lock member 18 can positively hold the slider 17 in the locked condition.

Further, in this embodiment, since the limiter pin 20 and the coil spring portion 24b of the hub lock spring 24 are formed as the frusta, the coil spring portion 24b can be smoothly situated around the limiter pin 20, which simplifies the assembly process and increases efficiency in assembly work.

Furthermore, various changes and modifications of the present invention may be possible. By way of example, the engagement supporting portion 25 for engagingly supporting the hub lock spring 24 may be modified as follows. The engaging surface thereof may be shaped as U-letter configuration in cross section as shown in FIG. 9. That is, an engaging concave portion 25b along the vertical engaging surface portion 25a1 is formed on the horizontal engaging surface portion 25a2 of the engaging surface 25a which is formed similarly to the engaging surface shown in FIGS. 8A and 8B, and the hub lock spring 24 may be engaged with and supported by this engaging concave portion 25b. By forming the engagement supporting portion 25, it is possible to support and secure the hub lock spring 24 more positively.

In addition, the layout of the respective members may be reversed in the upper and lower parts, and the configurations of the respective members may be changed, if necessary.

As set out above, according to the present invention, since one end portions of the pair of hub lock springs for spring-biasing the hub lock member are employed as the spring-biasing portions which are slidably engaged with the hub lock member, the coil spring portions are formed on the other end portions of the hub lock springs so as to be inserted into the limiter pins to oppose the slider lock member and the hub lock springs are engaged with and secured to the cassette casing at their intermediate portions, the hub lock member spring-biasing portions formed at one end portions and the coil spring portions are prevented from interfering with each other and act as the spring-biasing members independently, whereby the hub lock member can lock the reel hubs positively and the lock holding force of the slider lock member can be reinforced by the coil spring portions. Thus, the slider can be positively locked when it is opened and closed.

Furthermore, since the coil spring portions for reinforcing the lock holding force of the slider lock member are formed on the hub lock springs, the increase of assembly parts can be minimized and the assembly process can be prevented from becoming complicated as compared with the conventional magnetic tape cassette in which the slider locking coil spring is additionally assembled. Therefore, it is possible to realize the magnetic tape cassette in which the slider can be positively locked while the magnetic tape cassette is kept inexpensive from a money standpoint.

Having described a preferred embodiment of the invention with reference to the accompanying drawings, it is to be understood that the invention is not limited to that precise embodiment and that various changes and modifications could be effected by one skilled in the art without departing from the spirit or scope of the novel concepts of the invention as defined in the appended claims.

I claim as may invention:

1. A magnetic tape cassette having a cassette casing formed of upper and lower parts, reel hubs accommodated within said cassette casing and around which a magnetic tape is wound, a hub lock member for locking said reel hubs, a tape loading pocket portion formed on any one of said upper and lower parts, a slider for covering and uncovering reel shaft insertion apertures, a slider lock member provided on a part of said cassette casing through which said reel shaft insertion apertures are formed for locking said slider at an uncovering position and at a covering position and limiter pins for preventing said slider lock member from being deformed beyond a predetermined limit, said magnetic tape cassette comprising:

a left hub lock spring and an independent right hub lock spring, each for independently spring-biasing said hub lock member in a direction for locking said reel hubs from rotation, wherein each of said left and right hub lock springs comprises an elongate torsion spring having a coil spring formed on a first end of said elongate torsion spring, each of said coil spring portions being arranged around respective ones of said limiter pins, a second end of each of said elongate torsion springs opposite said first end being engaged with said hub lock member, and an intermediate portion of each of said elongate torsion springs located between said second end and said coil spring being engaged with and secured to a plurality of engagement supporting portions formed on one of said upper and lower parts.

2. The magnetic tape cassette according to claim 1, wherein the slider lock member is provided on said lower part of said cassette casing and said limiter pins are formed on an inner surface of the upper part of said casing opposite said slider lock member, said limiter pins having frustoconical shapes which are tapered thin at the tips thereof and extend toward said slider lock member so that said coil spring portions reinforce a lock holding force of said slider lock member.

3. The magnetic tape cassette according to claim 1, wherein said plurality of engagement supporting portions formed on one of said upper and lower parts are spaced and shaped so that facing vertical engagement surface portions of said plurality of engagement supporting portions are coincident with a straight line for urging said intermediate portions of said hub lock springs into contact against said facing vertical engagement surface portions.

* * * * *